US008151772B2

(12) United States Patent
Wilflinger et al.

(10) Patent No.: US 8,151,772 B2
(45) Date of Patent: Apr. 10, 2012

(54) SUPERCHARGED ENGINE

(75) Inventors: Johann Wilflinger, Linz (AT); Markus Hochmayr, Krenglbach (AT); Karl Lagler, Vienna (AT); Karl Glinsner, Wels (AT)

(73) Assignee: BRP-Powertrain GmbH & Co. KG, Gunskirchen (AT)

( * ) Notice: Subject to any disclaimer, the term of this patent is extended or adjusted under 35 U.S.C. 154(b) by 872 days.

(21) Appl. No.: 12/130,687

(22) Filed: May 30, 2008

(65) Prior Publication Data

US 2009/0293850 A1 Dec. 3, 2009

(51) Int. Cl.
*F02B 33/00* (2006.01)
*F16H 33/02* (2006.01)
*F16H 3/08* (2006.01)
*F16H 47/08* (2006.01)

(52) U.S. Cl. ................. 123/559.3; 123/559.1; 74/433.5; 74/359; 475/102

(58) Field of Classification Search .... 123/559.1–559.3; 475/102, 293, 297, 309, 319, 320, 321; 192/113.34, 192/85.21, 85.53, 85.42, 85.44, 85.52, 48.613, 192/3.57; 60/607–608; 74/433.5, 359, 117, 74/526; 440/111; *F02B 37/013, 37/10, 39/04*
See application file for complete search history.

(56) References Cited

U.S. PATENT DOCUMENTS

| | | | | | |
|---|---|---|---|---|---|
| 1,951,045 | A * | 3/1934 | Willgoos | 123/559.3 |
| 1,954,436 | A * | 4/1934 | Waseige | 74/359 |
| 1,977,553 | A * | 10/1934 | Halford | 475/52 |
| 2,077,292 | A * | 4/1937 | Waseige | 192/85.53 |
| 2,210,855 | A * | 8/1940 | Halford | 192/85.21 |
| 2,333,122 | A * | 11/1943 | Prescott | 74/433.5 |
| 2,390,626 | A * | 12/1945 | Szekely | 475/102 |
| 2,403,579 | A * | 7/1946 | Carpenter | 192/85.42 |
| 2,480,946 | A * | 9/1949 | McDowall et al. | 74/433.5 |
| 2,487,049 | A * | 11/1949 | Gille | 74/526 |
| 2,572,834 | A * | 10/1951 | Ball | 475/34 |
| 2,585,029 | A * | 2/1952 | Nettel | 192/3.57 |
| 2,632,544 | A * | 3/1953 | Hockert | 192/48.613 |
| RE24,645 | E * | 5/1959 | Chayne | 123/54.7 |
| 3,004,440 | A * | 10/1961 | Pernik | 74/117 |
| 3,418,986 | A * | 12/1968 | Scherenberg | 123/559.1 |
| 4,145,888 | A * | 3/1979 | Roberts | 60/608 |
| 5,033,269 | A * | 7/1991 | Smith | 60/607 |
| 5,168,972 | A * | 12/1992 | Smith | 123/559.3 |
| 5,632,703 | A * | 5/1997 | Wilkes et al. | 475/211 |
| 6,116,399 | A * | 9/2000 | Drexl et al. | 192/85.52 |
| 6,415,759 | B2 * | 7/2002 | Ohrnberger et al. | 123/195 A |

(Continued)

FOREIGN PATENT DOCUMENTS

JP 2037112 A 2/1990

(Continued)

OTHER PUBLICATIONS

English abstract of Japanese application JP2037112, Published on Feb. 7, 1990.

*Primary Examiner* — Thai Ba Trieu
(74) *Attorney, Agent, or Firm* — Osler, Hoskin & Harcourt LLP

(57) ABSTRACT

A supercharged internal combustion engine is disclosed which includes a supercharger operatively connected to the crankshaft via a clutch supported by an intermediate shaft such that torque variations are partially absorbed by the clutch.

3 Claims, 11 Drawing Sheets

U.S. PATENT DOCUMENTS

| | | | | |
|---|---|---|---|---|
| 6,447,422 | B1 * | 9/2002 | Haka | 475/211 |
| 7,513,812 | B1 * | 4/2009 | Hochmayr et al. | 440/111 |
| 7,591,254 | B2 * | 9/2009 | Machner | 123/559.1 |
| 7,654,876 | B1 * | 2/2010 | Jones et al. | 123/559.1 |
| 2001/0052340 | A1 * | 12/2001 | Sonnleitner et al. | 123/564 |
| 2004/0079179 | A1 | 4/2004 | Holzleitner | 74/7 |
| 2007/0062498 | A1 * | 3/2007 | Woods | 123/559.1 |
| 2007/0068465 | A1 * | 3/2007 | Wolfsgruber et al. | 123/1 A |
| 2009/0031725 | A1 * | 2/2009 | Schenck et al. | 60/624 |
| 2010/0031935 | A1 * | 2/2010 | VanDyne et al. | 123/559.1 |

FOREIGN PATENT DOCUMENTS

| | | | | |
|---|---|---|---|---|
| JP | 09112288 | A | * | 4/1997 |
| JP | 10103074 | A | * | 4/1998 |
| WO | WO 2006079433 | A1 | * | 8/2006 |

* cited by examiner

SUPERCHARGED ENGINE

FIELD OF THE INVENTION

The present invention relates to an engine having a supercharger for enhancing engine performance.

BACKGROUND OF THE INVENTION

Four-stroke engines are now being installed in personal watercraft to meet present and future stricter environmental and emission regulations.

To boost the power output of a four-stroke engine such that smaller displacement engine can be used, manufacturers of personal watercraft have, in some cases, equipped the four-stroke engines being used with a supercharger. A supercharger accomplishes this by forcing more air into the combustion chamber. More air means more fuel can be added into the combustion chamber, and more fuel means a more powerful explosion and greater horsepower.

A supercharger increases intake by compressing air above atmospheric pressure, without creating a vacuum. This forces more air into the engine, providing a “boost.” With the additional air in the boost, more fuel can be added to the charge, and the power and torque of the engine is increased.

A supercharger is mechanically driven by the engine’s crankshaft either directly through gears or by belt- or chain-drive from the engine’s crankshaft which wraps around a gear that rotates the compressor of the supercharger. The rotor of the compressor can come in various designs, but it always draws air in, squeezes the air into a smaller space and discharges it into the intake manifold thereby achieving forced air induction and higher power output for a given engine displacement.

To pressurize the air, a supercharger must spin more rapidly than the crankshaft of the engine driving it. The multiplication of rotation speed of the crankshaft is typically achieved through gear multiplication. To multiply the rotation of the crankshaft, the drive gear connected to the crankshaft is larger than the compressor gear of the supercharger thereby causing the compressor to spin faster than the crankshaft. Superchargers can spin at speeds as high as 60,000 rotations per minute (RPM) and the multiplication ratio between the crankshaft and the compressor gear is therefore in the range of 1:4 to 1:12.

A personal watercraft is generally quite sporting in nature and normally accommodates at least the rider on a type of seat on which the rider sits in a straddle fashion. The passenger’s area is frequently open through the rear of the watercraft so as to facilitate entry and exit of the rider and passengers to the body of water in which the watercraft is operating. A personal watercraft is generally quite small compared to a boat, and due to its sporting nature, it is fast and agile and its mechanical components are subjected to pounding as the personal watercraft hits the water.

During operation, the propulsion system of the personal watercraft may become momentarily disengaged from the water thus causing thus subjecting the engine to large variations in engine load and torque. As well, the supercharger of the engine, which is mechanically powered by the crankshaft, is subjected to large variation in rotation speed and torque due to the engine’s load variations. Furthermore, every combustion in each individual cylinder produce a torque peaks on the crankshaft which are transmitted to the supercharger. As the engine and supercharger speed and torque fluctuate continuously, the supercharger is less efficient than it would otherwise be in a more stable environment. Also, the various components of the supercharger are exposed to increasing mechanical loads which increase wear and reduce the durability of the supercharger.

To alleviate this problem, a friction clutch or a one-way clutch has been coupled directly to the gear rotating the compressor of the supercharger in order to reduce the variations in rotation speed of the compressor by slipping when there is a rapid change in engine torque and speed.

However, due to the gear multiplication between the crankshaft and the supercharger previously mentioned, a friction clutch or one-way clutch coupled directly to the compressor gear of the supercharger and therefore rotating at the same speed as the compressor can only reduce a small portion of the variations in rotation speed of the compressor. The high rotational speed of the supercharger shaft and therefore the high centrifugal forces exerted on the clutch limits the size of the clutch to a small diameter clutch. A small diameter clutch is subject to high specific heat input especially considering that the continuous torque peaks caused by every combustion in each individual cylinder. The small clutch performs microslips in every cycle of the engine and generates heat continuously which causes heat build-up and increase wear and reduce the durability of the clutch.

Thus, there is a need for a supercharged engine having a dampening system for the supercharger that reduce variations in rotation speed and torque of the supercharger due to engine torque variations.

SUMMARY OF THE INVENTION

It is an object of the present invention to ameliorate at least some of the inconveniences present in the prior art.

It is also an object of the present invention to provide supercharged engine having a dampening system mounted at an intermediate position between the supercharger and the crankshaft of the engine.

In one aspect, the invention provides a supercharged internal combustion engine, comprising: a crankcase having a crankshaft rotatably mounted therein; a cylinder block connected to the crankcase, a cylinder head connected to the cylinder block wherein the cylinder block and the cylinder head form at least one combustion chamber; at least one air intake passageway operatively coupled to the combustion chambers; an air intake manifold connected to the cylinder head and operatively connected to the at least one air intake passageway; and a supercharger for boosting air to the air intake manifold, the supercharger having a driven shaft operatively connected to the crankshaft via a friction clutch supported by an intermediate shaft.

In a further aspect, the crankshaft rotates at a first speed, the driven shaft of the supercharger rotates at a second speed and the intermediate shaft rotates at a third speed intermediate the first speed and the second speed.

In a another aspect the second speed is higher than the first speed.

In an additional aspect, the intermediate shaft is connected to the driven shaft of the supercharger via gears and the intermediate shaft rotates at a lower speed than the driven shaft of the supercharger through gear reduction.

In a further aspect, the driven shaft of the supercharger is decoupled from the intermediate shaft by the friction clutch such that the friction clutch absorbs a portion of variation of engine torque.

In an additional aspect, the maximum torque transmitted by the friction clutch is 120% to 350% of an average torque at the driven shaft of the supercharger at maximum engine power. The maximum torque transmitted by the friction clutch may be 150% to 250% of an average torque at the driven shaft of the supercharger at maximum engine power.

In an additional aspect, the supercharged engine further comprising an electric starter having a drive gear, the intermediate shaft further comprises a reduction gear operatively connected to the starter drive gear wherein in a starting operation, the electric starter rotates the crankshaft via the reduction gear of the intermediate shaft. The reduction gear is connected to the intermediate shaft through a one-way clutch.

In another aspect, the invention provides a supercharged internal combustion engine, comprising: a crankcase having a crankshaft rotatably mounted therein; a cylinder block connected to the crankcase, a cylinder head connected to the cylinder block wherein the cylinder block and the cylinder head form at least one combustion chamber; at least one air intake passageway operatively coupled to the combustion chambers; an air intake manifold connected to the cylinder head and operatively connected to the at least one air intake passageway; and a supercharger for boosting air to the air intake manifold, the supercharger having a driven shaft operatively connected to the crankshaft via an elastomeric damper supported by an intermediate shaft.

In a further aspect the supercharged internal combustion engine further comprises a friction clutch mounted directly on the driven shaft of the supercharger.

In a additional aspect, the friction clutch is operatively connected to the intermediate shaft.

In another aspect, the supercharged internal combustion engine further comprises a friction clutch mounted directly on the intermediate shaft and combined with the elastomeric damper.

In another aspect, the invention provides a personal watercraft, comprising: a hull; a deck disposed on the hull; an engine compartment defined between the hull and the deck; a supercharged internal combustion engine, comprising: a crankcase having a crankshaft rotatably mounted therein; a cylinder block connected to the crankcase, a cylinder head connected to the cylinder block wherein the cylinder block and the cylinder head form at least one combustion chamber; at least one air intake passageway operatively coupled to the combustion chambers; an air intake manifold connected to the cylinder head and operatively connected to the at least one air intake passageway; and a supercharger for boosting air to the air intake manifold, the supercharger having a driven shaft operatively connected to the crankshaft via a friction clutch supported by an intermediate shaft.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
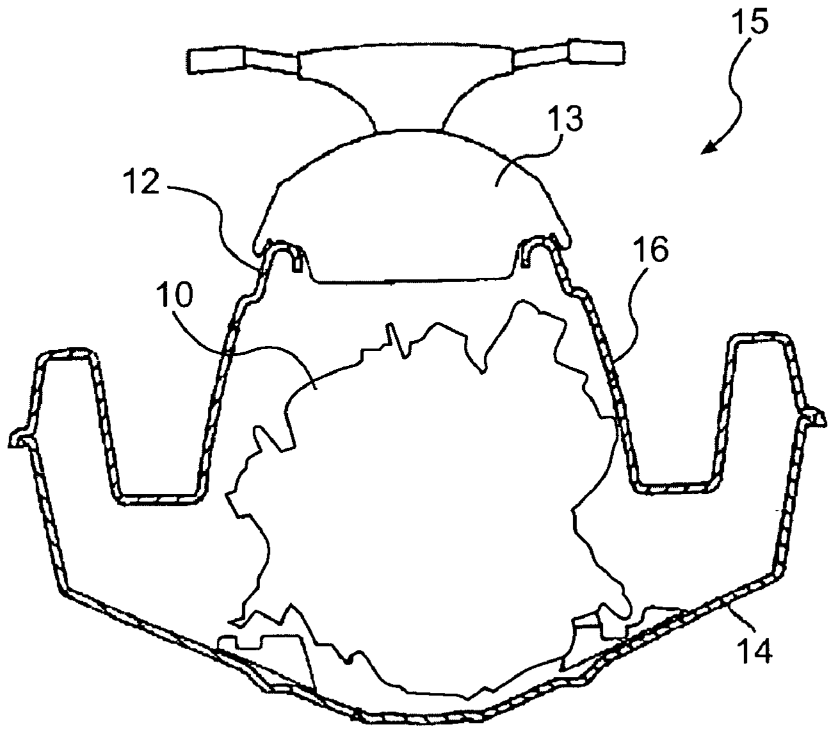
FIG. 1 is a rear cross-sectional view of a personal watercraft having an engine in accordance with one embodiment of the invention in one possible location within a personal watercraft.
Figure 2:
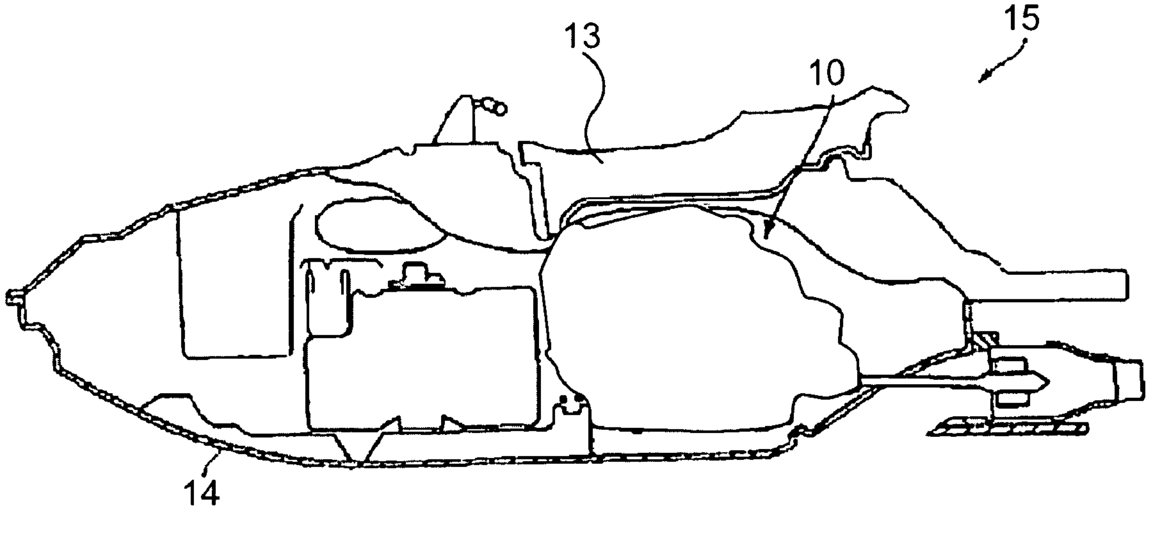
FIG. 2 is a side cross-sectional view of the personal watercraft shown in FIG. 1 illustrating one possible location of the engine within the personal watercraft.

A four-stroke three cylinder in-line engine 10 is illustrated generally in FIGS. 3-9. The engine 10 shown schematically in FIGS. 1 and 2 is primarily designed for use in a personal watercraft 15. The engine 10 is adapted to be installed below a raised pedestal 12 having a straddle seat 13 inside the hull 14 and below the deck 16, as shown in FIGS. 1 and 2. The engine 10 is accessible through the straddle seat 13 which is connected to the raised pedestal 12 via latches as is standard practice in the personal watercraft industry. A personal watercraft is described in detail in U.S. Pat. No. 7,377,223 which is herein incorporated by reference in its entirety.

While designed for use in personal watercraft, it is contemplated that the engine 10 can be used in all terrain vehicles, snowmobiles, boats and other vehicles with minor modifications depending on the specific vehicle or specific application.

Figure 3:
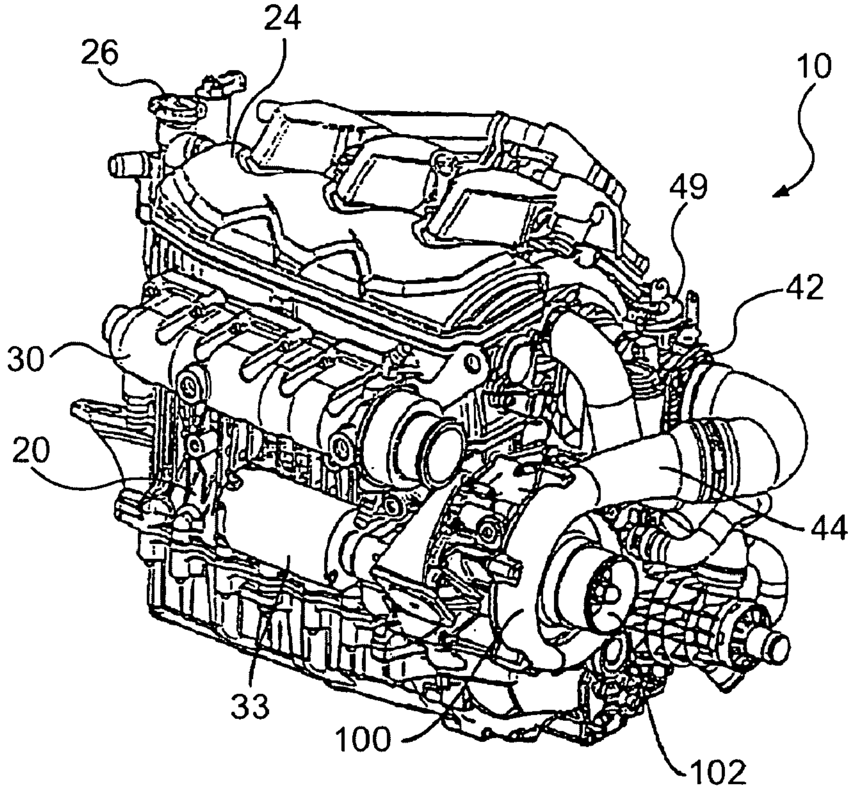
FIG. 3 is a schematic downward rear left perspective view of an engine in accordance with one embodiment of the invention.
Figure 4:
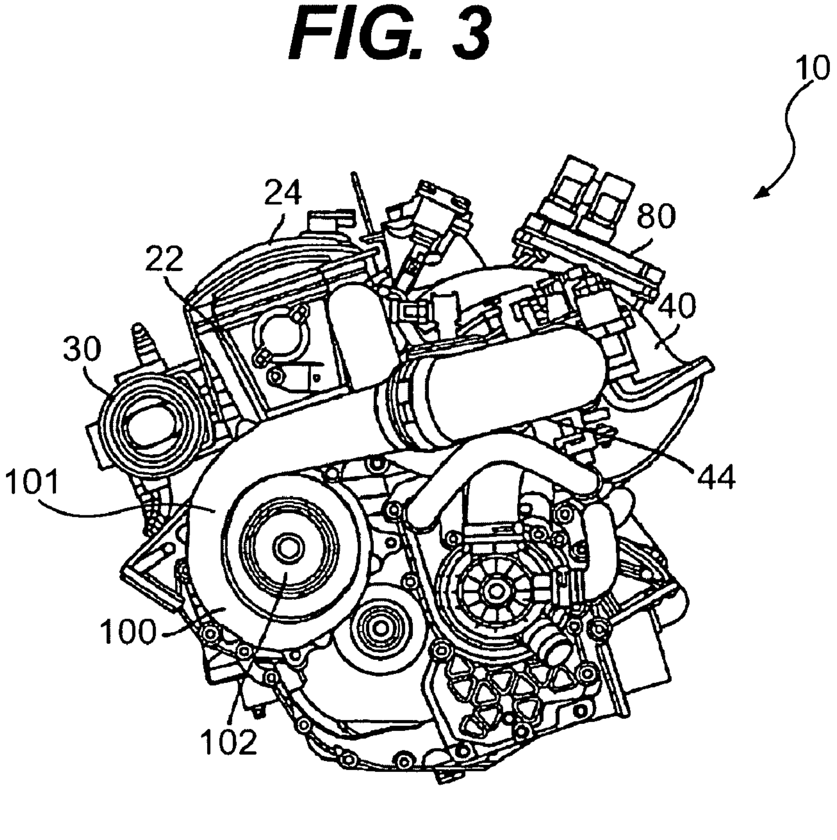
FIG. 4 is a rear elevational view of the engine of FIG. 3.
Figure 5:
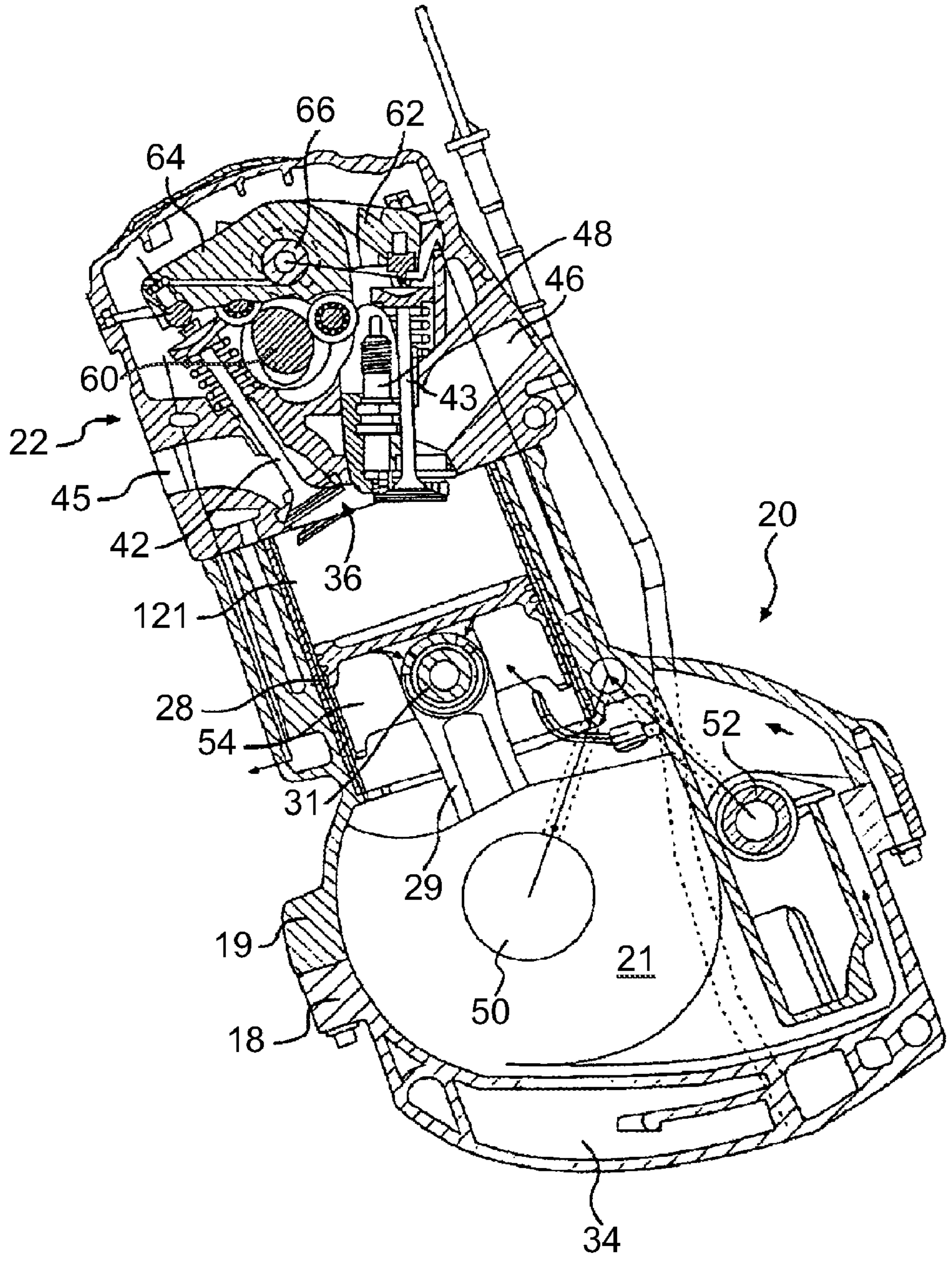
FIG. 5 is a partial transverse cross-sectional end view of a crankcase and cylinder head housing taken through the center of a cylinder of the engine shown in FIG. 3.
Figure 6:
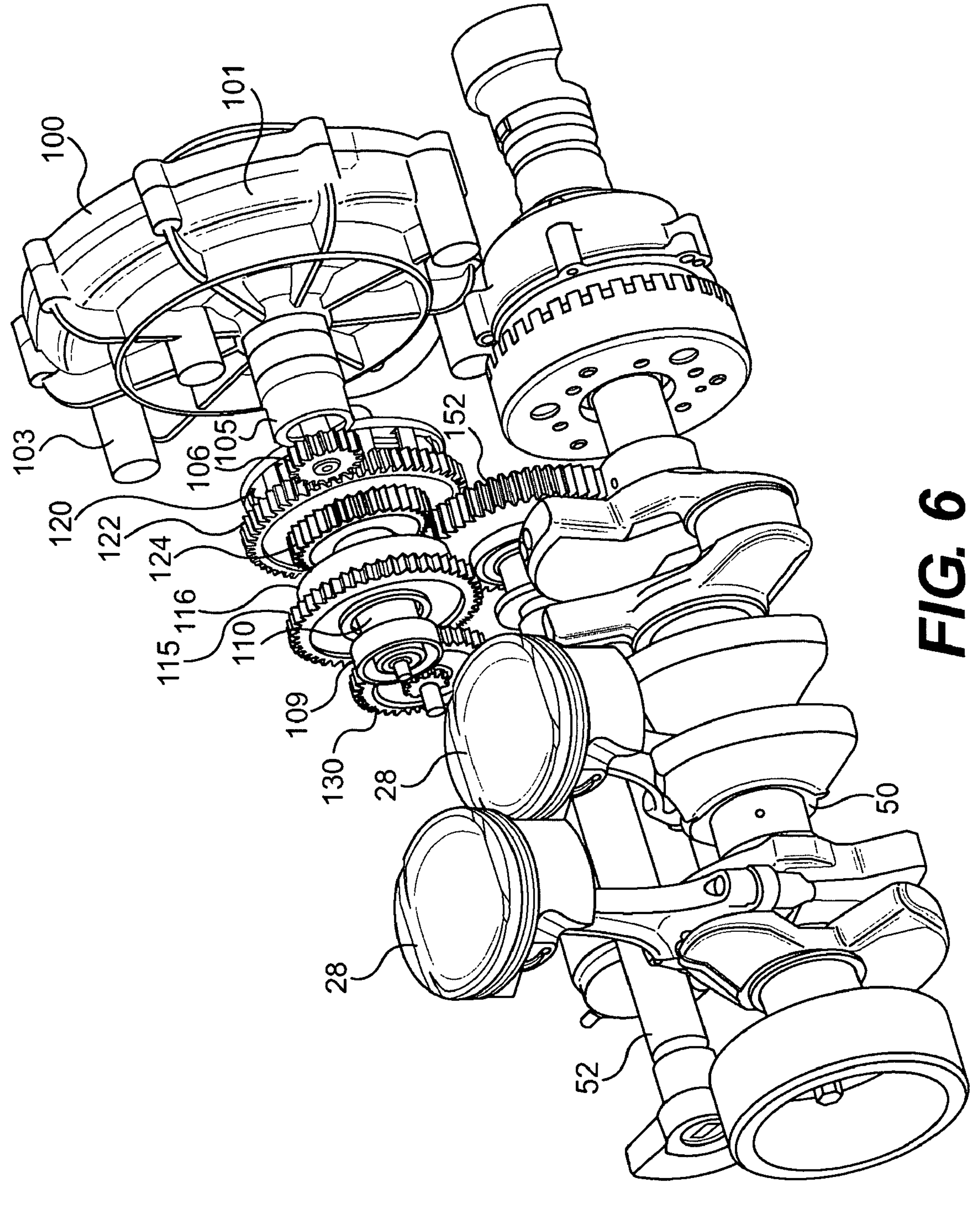
FIG. 6 is a downward front left perspective view of selected mechanical components of the engine in accordance with one embodiment of the invention.
Figure 7:
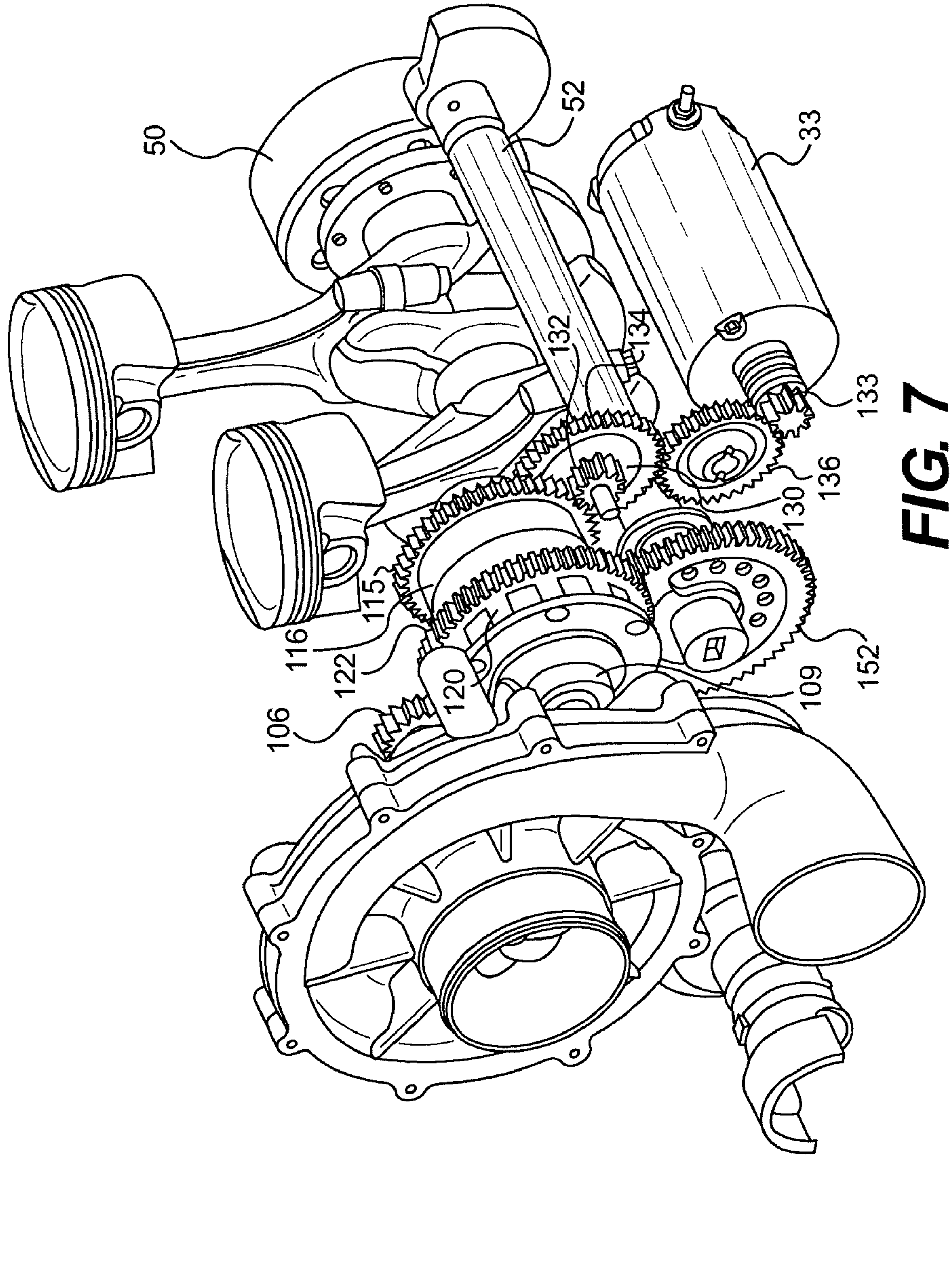
FIG. 7 is a downward rear right perspective view the selected mechanical components shown in FIG. 6.
Figure 8:
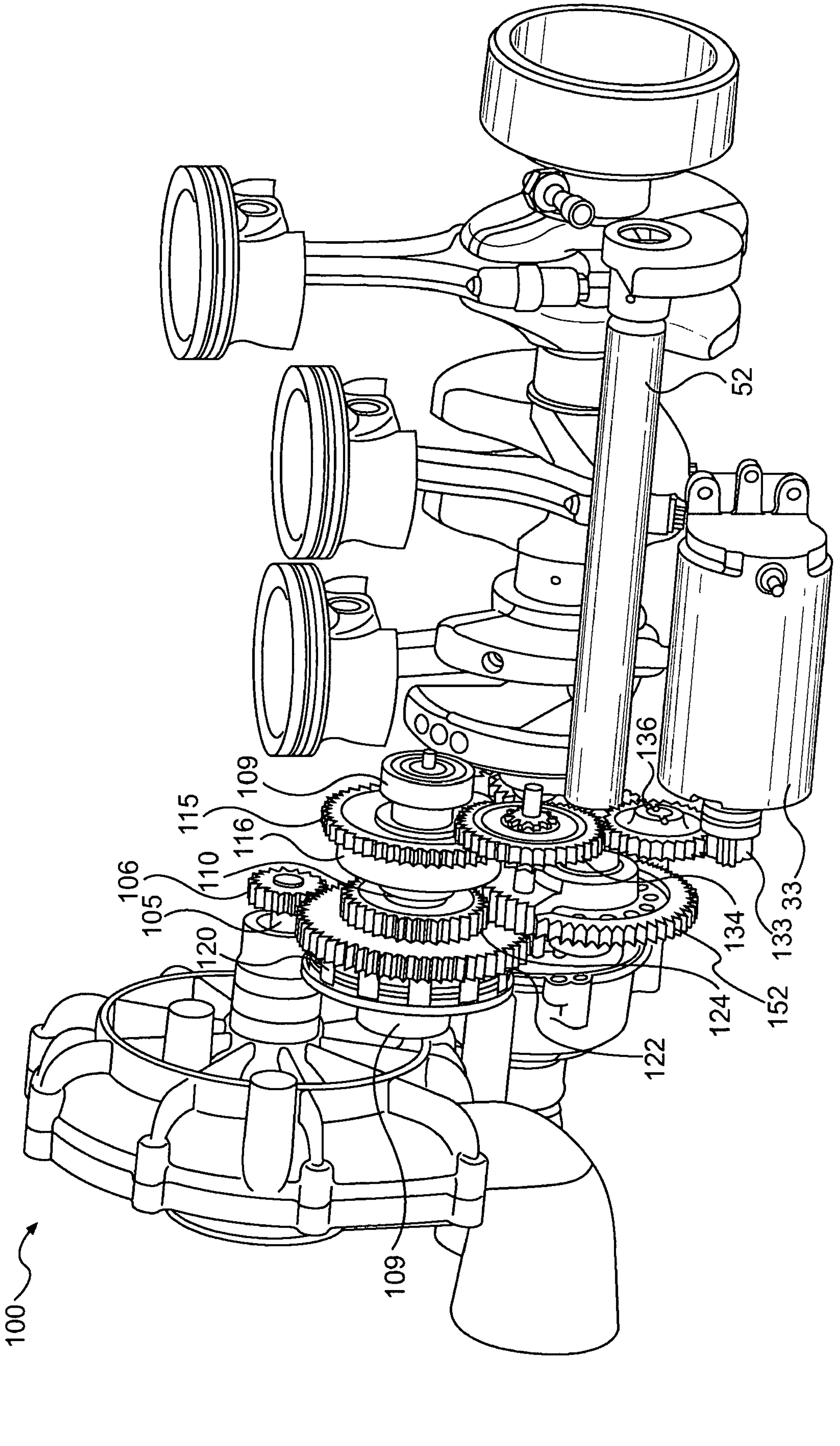
FIG. 8 is a right side perspective view of the selected mechanical components shown in FIG. 6.

With reference to FIGS. 3 and 4, the engine 10 includes a crankcase 20. A cylinder head housing 22 is connected to the crankcase 10 to form a plurality of combustion chambers. The crankcase 20 and cylinder head housing 22 are inclined with respect to a vertical axis, as shown in FIG. 5. This arrangement provides sufficient space for the air intake and fuel injection system 40 while maintaining an overall reduced engine profile. The engines illustrated and described herein include three cylinders. The present invention, however, is not limited to three cylinders; rather, it is contemplated that a greater or fewer number of cylinders are considered to be well within the scope of the present invention. For example, two or three cylinder versions of the engine may be employed in a personal watercraft; a four cylinder version of the engine may be employed in a jet boat. Four or more cylinders are considered to be well within the scope of the present invention.

The engine 10 includes an exhaust manifold 30 that is secured to one side of the cylinder head housing 22 and an intake manifold 42 secured to an opposite side of the cylinder head housing 22. An air intake and fuel injection system 40 is connected to the intake manifold 42 in the area above the cylinder head housing 22. The engine 10 includes a supercharger 100 to enhance engine performance as compared to a normally aspirated engine. The supercharger 100 is in fluid communication with the air intake manifold 42 through an air passageway 44 which collects the air compressed by the supercharger 100. The air intake manifold 42 includes a throttle body 49 containing a throttle valve at the plenum inlet to regulate the flow of compressed air into the manifold 42. The throttle body 49 is located between the air intake manifold 42 and the supercharger 100. The degree of opening of the throttle valve of the throttle body 49 is controlled by an engine management system 80. The throttle valve could also be manually activated with cables, for example connected to a lever.

The air intake and fuel injection system 40 includes a fuel injection assembly (not shown). The fuel injection assembly extends along an upper portion of the air intake manifold 42. At least one fuel injection nozzle extends adjacent each intake passageway 46 of the cylinder housing 22 (FIG. 5). A fuel injection nozzle is typically provided for each engine cylinder. The fuel injection nozzles are electromagnetically controlled by the engine management system 80 so that the nozzles are independently and sequentially operated. The fuel injection nozzles could be activated by any other means known to those skilled in the art.

The supercharger 100 includes a cast housing 101, which is preferably formed from a metal, however, it may be formed from a high strength plastic or other suitable material. The housing 101 includes an inlet portion 102 operatively connected to an airbox (not shown). Air enters the supercharger 100 through the inlet portion 102. Located within the housing 101 adjacent the inlet portion 101 is a compressor, which operates to draw air into the supercharger from the airbox. The housing 101 includes mountings 103 (FIG. 6) for securing the supercharger 100 to the crankcase 20.

The engine 10 also includes an electric starter 33 operatively connected to the crankshaft of the engine 10. The engine 10 includes other ancillary components such as an cylinder head cover 24, oil filler tube 26, various hoses, thermostat, pump assembly, etc.

Figure 9:
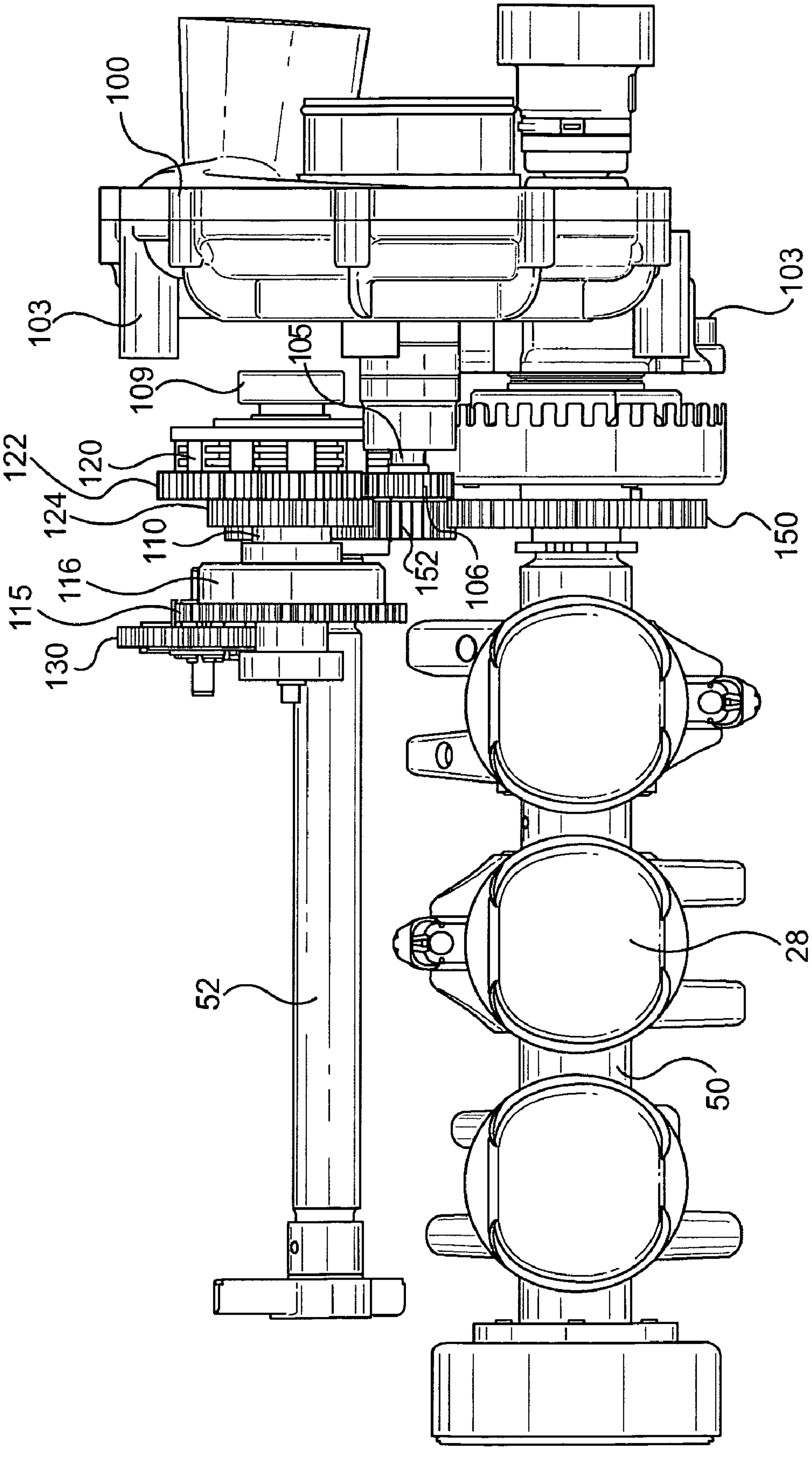
FIG. 9 is a top view of the selected mechanical components shown in FIG. 6.

Referring now to FIG. 5, The crankcase 20 includes an upper crankcase 19 containing the cylinder block and a lower crankcase 18. The crankcase 20 includes at least one crank chamber 21 and in the preferred embodiment includes one isolated crank chamber for each engine cylinder. A counter balancing shaft 52 and a crankshaft 50 are located at the union between the lower crankcase 18 and the upper crankcase 19. The counter balancing shaft 52 is provided to counteract the moment generated by rotation of the crankshaft 50. This arrangement produces mass counter balancing of the first order. The counter balancing shaft 52 and the crankshaft 50 extend in a parallel relationship, as shown in FIG. 9. The counter balancing shaft 52 is rotatably mounted within a bore that extends through the crankcase 20. Suitable bearing assemblies are provided for smooth rotation of the counter balancing shaft 52. The bearing assemblies are fixed using the fasteners. As best shown in FIG. 9, the counter balancing shaft 52 is operatively connected by gear 152 to the crankshaft 50 through gear 150.

An oil tank 34 is formed in a bottom portion of the lower crankcase 18. The oil tank 34 has a generally u-shaped configuration that partially surrounds the bottom of the lower crankcase 18. The oil tank 34 is located on both the bottom and side of the engine to house the necessary volume of oil while maintaining the engine's reduced profile such that oil is located on the bottom of the crankcase and the side of the crankcase 20.

A cylinder 54 extends through the crankcase 20 above each of the crank chambers 21. In accordance with the present invention, the engine 10 includes three cylinders 54. A piston 28 is slidably received within the cylinder 54. The piston 28 reciprocates axially within the cylinder 54 as is known. The piston 28 is connected to the crankshaft 50 through a connecting rod 29 and piston pin 31 to convert axial movement of the pistons 28 to rotational movement of the crankshaft 50 and vice-versa.

The cylinder head housing 22 is secured to the upper end of the crankcase 20. The cylinder head housing 22 is bolted to the crankcase 20 and provides a combustion chamber 36 above each cylinder 54. At least one exhaust valve 42 and at least one intake valves 43 are mounted in each combustion chamber 36. As shown in FIG. 5, the exhaust valve 42 is located on one side of the cylinder head housing 22 and the intake valve 43 is located on an opposite side of the cylinder head housing 22. The engine 10 may include a pair of exhaust valves and a pair of intake valves. Furthermore, more than two intake and exhaust valves may also be provided. Any combination of intake and exhaust valves is contemplated provided each cylinder includes more intake valves than exhaust valves. The intake valves 43 and the exhaust valves 42 are disposed at an angle with respect to the vertical axis of the engine 10. This reduces the height of the cylinder head housing 22, which reduces the overall height of the engine 10. The cylinder head housing 20 further includes at least one exhaust passageway 45 for each combustion chamber 36 extending through the cylinder head housing 22. The exhaust valve 42 is positioned in exhaust passageway 45 to selectively open and close the exhaust passageway 45 at predetermined intervals to permit the removal of exhaust gases from the chamber 36. The opposite end of the exhaust passageway 45 is operatively connected to the exhaust manifold 30 (FIG. 1). The exhaust manifold 30 is secured to the cylinder head housing 20 using suitable fasteners.

The cylinder head housing 22 further includes at least one intake passageway 46 for each cylinder 54 extending through the cylinder head housing 22. The intake valve 43 is positioned in intake passageway 46 to selectively open and close the intake passageway 46 at predetermined intervals to permit the influx of fuel and air into the chamber 36. The opposite end of the intake passageway 46 is operatively connected to the air intake and fuel injection system 40. The air intake and fuel injection system 40 is secured to the cylinder head housing 22 opposite the exhaust manifold 30 using suitable fasteners. The cylinder head housing 22 includes a spark plug 48 that is located in a central inclined position and provides the sparks to ignite the air-fuel mixture introduced through the opened intake valve 43. The spark plug 48 is connected by threaded engagement to the cylinder head housing 22 such that an electrode portion of the spark plug 48 extends into the cylinder. The spark plug 48 is located between the intake valves 43 and the exhaust valves 42 closer to the intake valves 43 because the intake side of the engine is cooler than the exhaust side of the engine.

A valve operating assembly operates the intake valves 43 and exhaust valves 42 in accordance with predetermined engine operating parameters. The valve operating assembly is located within the cylinder head housing 22 operatively connected to, and driven by the crankshaft 50. A camshaft 60 is rotatably mounted within the cylinder head housing 22. One end of the camshaft 60 extends into a chamber within the cylinder head housing 22 and is connected by timing chain or belt to the crankshaft 50. The camshaft 60 is rotatably mounted to the cylinder head housing 22 in a position between the intake and exhaust valves 43 and 42. Suitable bearing assemblies are provided for the smooth operation and rotation of the camshaft 60 within the cylinder head housing 22. A plurality of cam lobes are provided along the camshaft 60 to operate the valves 43 and 42 in each cylinder. A series of cam lobes provide the necessary motion to operate the intake valves 43 through the rocker arm assembly 62 and to operate the exhaust valves 42 through the rocker arm assemblies 64. The cams are oriented on the camshaft 60 to produce a predetermined timing for opening and closing the valves 43 and 42. The orientation of the cams vary for each cylinder such that all cylinders do not operate at the same time, rather the cylinders operate in a predetermined sequence. The rocker arm assemblies 62 and 64 are rotatably mounted on a rocker arm support axle 66 in a position between the intake and exhaust valves 43 and 42. The stationary support axle 66 is mounted to the cylinder head 22 by a plurality of fasteners.

With reference to FIGS. 6 to 9, the supercharger 100 includes a driven shaft 105 which is directly connected to the compressor located within the housing 101 of the supercharger 100. A small gear 106 is connected to the end of the driven shaft 105. An intermediate shaft 110 is positioned adjacent the driven shaft 105 of the supercharger 100 and is supported by a pair of bearings 109 at each end of the intermediate shaft 110. A friction clutch 120 is positioned on the intermediate shaft 110 and links an intermediate drive gear 122 to an intermediate driven gear 124 both mounted to the intermediate shaft 110. The intermediate drive gear 122 is meshed to gear 106 of the driven shaft 105 of the supercharger 100 while the intermediate driven gear 124 is meshed to gear 152 of the counter balancing shaft 52. As best shown in FIG. 9, gear 152 of the counter balancing shaft 52 is meshed to the gear 150 of the crankshaft 50. In operation, crankshaft 50 is rotated by the actions of the reciprocating pistons 28 within the cylinders 54; the rotation and torque of the crankshaft 50 is transferred by gear 150 to the counter balancing shaft 52 through gear 152 which rotates at the same speed as the crankshaft 50. Gear 152 of the counter balancing shaft 52 in turn transfers the rotation and torque to the intermediate shaft 110 through the intermediate driven gear 124. Since the intermediate driven gear 124 has a smaller radius than the radius of gear 52, the speed of rotation of the intermediate shaft 110 is higher than the speed of rotation of the counter balancing shaft 52 and the crankshaft 50 by the multiplying effect of the smaller intermediate driven gear 124 meshing with the larger gear 52. Through the friction clutch 120, the rotation and torque of the intermediate shaft 110 is transferred to the intermediate drive gear 122 which has a larger radius than the intermediate driven gear 124. The large radius intermediate drive gear 122 is meshed to the much smaller gear 106 the driven shaft 105 of the supercharger 100 thereby further multiplying the initial rotational speed of the crankshaft 50. The rotation and torque of the intermediate shaft 110 is transferred from the intermediate drive gear 122 to the driven shaft 105 of the supercharger 100 and to the compressor within the housing 101 which may rotate at up to 50,000 rpm. Through the gears 150, 152 124, 122 and finally gear 105, the rotational speed may be increase four to twelve times the initial rotational speed of the crankshaft 50 in order to maximize the efficiency of the compressor of the supercharger 100.

A centrifugal supercharger as illustrated in FIGS. 6 to 9 must power its compressor, a device similar to a rotor, at very high speeds to quickly draw air into its compressor housing. Compressor speeds can reach 60,000 RPM. As the air is drawn in at the hub of the compressor, centrifugal force causes it to radiate outward. The air leaves the compressor at high speed, but medium pressure. A diffuser at the exit of the compressor reduces the speed and increases the pressure of the air which is then routed to the air intake manifold.

When the engine 10 is used in a personal watercraft 15 as shown in FIGS. 1 and 2, the engine 10 is subjected to large variation in load and torque as the personal watercraft 15 momentarily leaves the water and falls back down in the water. The load and torque of the engine 10 peak putting strains on the supercharger 100. The friction clutch 120 effectively decouples the supercharger 100 from engine variations when they peak and absorbs a substantial portion of the torque peaks such that they are not all transferred to supercharger 100. Furthermore, the friction clutch 120 is mounted on the intermediate shaft 110 which rotates at a significantly lower speed than the compressor of the supercharger 100 by gear reduction. This arrangement has the advantage of enabling the use of a larger diameter friction clutch than would be possible if the friction clutch was mounted directly onto the driven shaft 105 of the supercharger 100 as in prior art system due to the lower centrifugal forces resulting from the lower rotational speed of the intermediate shaft 110. The increase diameter of the friction clutch 120 allows the use of composite friction coating e.g. paper coating, to improve slip control. In particular, linear torque transmission and low static friction can be achieved. Also, the heat generated by the permanent microslips of the friction clutch 120 caused by the continuous torque peaks produced by every combustion in each individual cylinder is more efficiently dissipated by the larger diameter friction clutch 120 than prior art systems.

Figure 10:
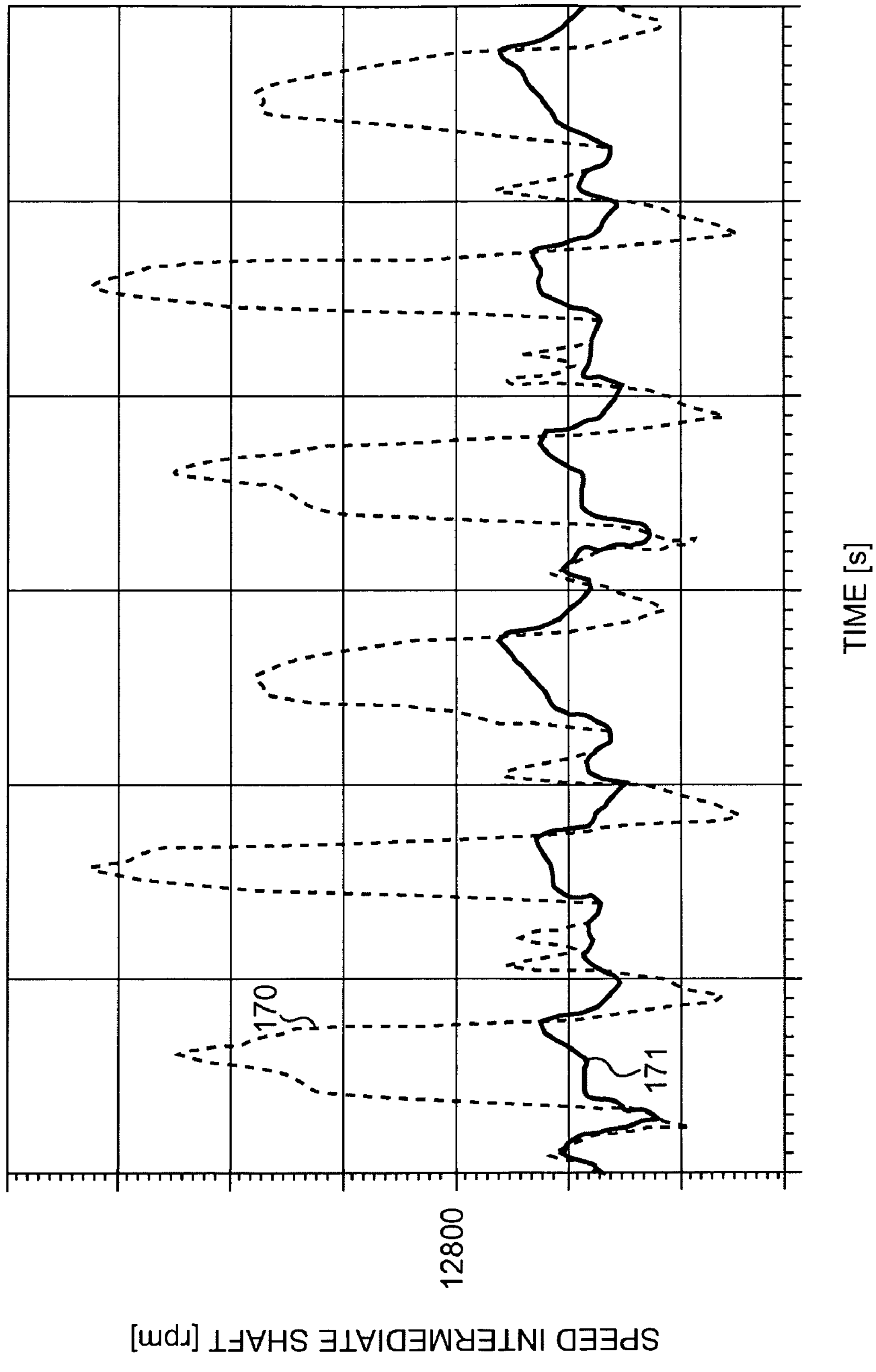
FIG. 10 is a graph illustrating the reduction in the amplitude of the variations of rotational speed of an intermediate shaft having a friction clutch.

FIG. 10 is a graph illustrating the reduction in the amplitude of the variations of rotational speed between the intermediate driven gear 124 and the intermediate drive gear 122 resulting from the slipping of the friction clutch 120 decoupling the intermediate driven gear 124 from the intermediate drive gear 122. The first curve 170 represents the variation of rotational speed of the intermediate driven gear 124 whereas the second curve 171 represents the variation of rotational speed of the intermediate drive gear 122. It can be seen that while the first curve 170 includes large variations and peaks of more than 500 rpm, the variations of the second curve 171 remains within a range approximately 100 rpm. Since this absorption of variations occurs at the intermediate shaft 110 as opposed to directly at the driven shaft 105 of the supercharger 100, its effect are multiplied at the driven shaft 105 of the supercharger 100. The reduction of the variations of 500 rpm to variations of 100 rpm translates at the driven shaft 105 of the supercharger 100 into a reduction of variations from approximately 2000 rpm to variation of approximately 400 rpm. The compressor of the supercharger 100 is therefore more stable, more efficient and less subjected to wear thereby increasing the durability of the supercharger 100.

Referring back to FIGS. 7 and 8, the intermediate shaft 110 includes a reduction gear 115 which is mounted to the intermediate shaft 110 via a one-way clutch 116. The reduction gear 115 is connected to a transfer gear assembly 130 including a small gear 132 and a larger gear 134. The reduction gear 115 is meshed to the small gear 132 whereas the larger gear 134 is meshed to a second transfer gear 136 of a diameter substantially equal to the diameter to gear 134. The second transfer gear 136 is meshed with the drive gear 133 of the electric starter 33. In the starting operation of the engine 10, the drive gear 133 of the electric starter 33 rotates the second transfer gear 136 which in turn rotates the larger gear 134 of the transfer gear assembly 130 thereby rotating the small gear 132. The small gear 132 rotates the reduction gear 115 which rotates the intermediate shaft 110 through the one way clutch 116. The intermediate driven gear 124 transfer the rotation of the intermediate shaft 110 to gear 152 of the counter balancing shaft 52 which in turn rotates gear 150 of the crankshaft 50 thereby cranking the engine 10 to start.

Figure 11:
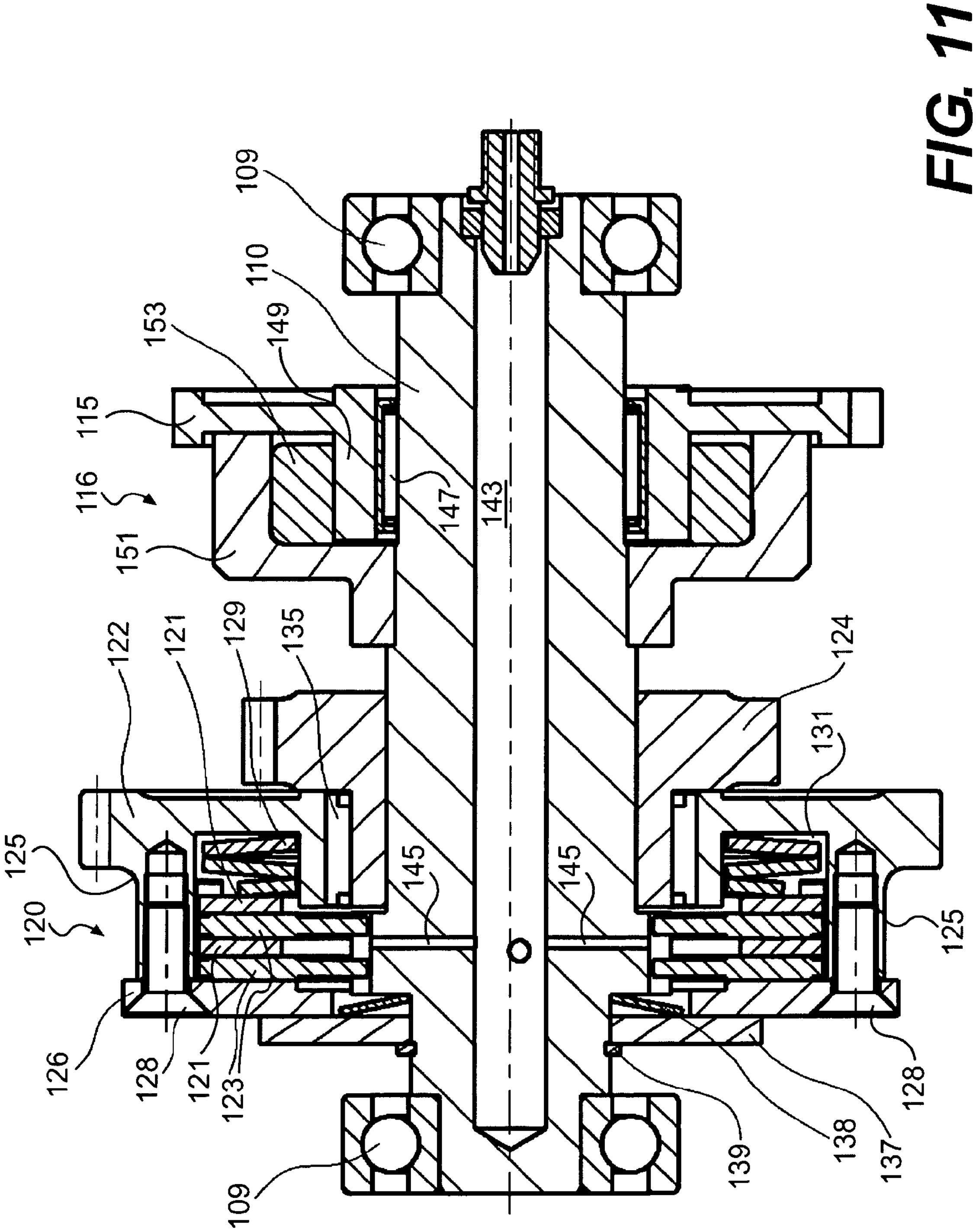
FIG. 11 is a schematic cross-sectional view of an intermediate shaft having a friction clutch assembly and a one-way clutch assembly.
Figure 12:
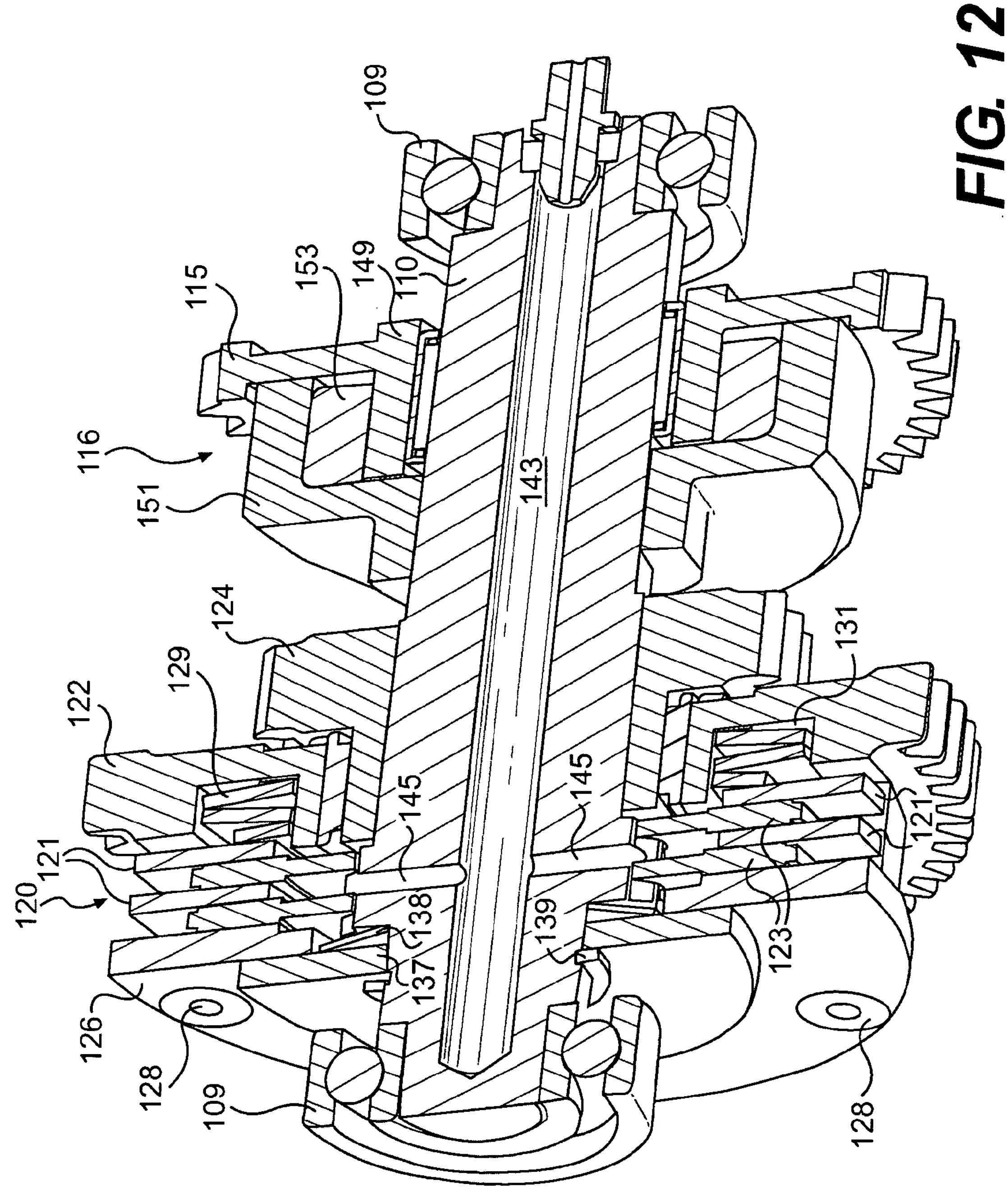
FIG. 12 is a schematic cross-sectional perspective view of the intermediate shaft and clutch assemblies of FIG. 11.

Referring to FIGS. 11 and 12, the intermediate shaft 110 and its related components will now be described in details. The intermediate shaft 110 is supported for rotation by a pair of bearings 109 and is driven by the intermediate driven gear 124 which is rigidly connected to the intermediate shaft 110. The intermediate drive gear 122 includes spacing members 125 which extend laterally to an end plate 126 rigidly connected to the spacing members 125 with a series of fasteners 128 threaded into the spacing members 125. Catch plates 121 are inserted between the spacing members 125 and therefor engaged to the intermediate drive gear 122. Laminated disks 123 are rigidly connected to the intermediate shaft 110 and engaged thereto. A series of disk springs 129 are positioned within a recess 131 of the intermediate drive gear 122 and apply pressure onto the laminated disks 123 and the catch plates 121. The intermediate drive gear 122, end plate 126, catch plates 121, laminated disks 123 and disk springs 129 together define the friction clutch module 120. The friction clutch module 120 is supported onto the intermediate drive gear 124 by a bearing 135 such that the intermediate drive gear 122 may rotate freely relative to the intermediate driven gear 124 and the intermediate shaft 110. The clutch module 120 is axially maintained within tolerances by a washer 137 abutting against the end plate 126. The washer 137 is axially maintained in position by a circ clip 139 on one side, and by a disk spring 138 abutting against a shoulder 141 on the intermediate shaft 110 on the other side. The friction clutch 120 may be operated under wet condition by introducing lubricating fluid through a central conduit 143 of the intermediate shaft 110 which would be routed through small conduits 145 connecting the central conduit 143 to the laminated disks 123 and catch plates 121. This would enable higher heat dissipation.

The friction clutch module 120 is biased in the engaged position by the spring disks 129 such that the intermediate drive gear 122 rotates with the intermediate driven gear 124 until a maximum torque is reached at which point the friction clutch 120 begins to slip thereby partially isolating the supercharger 100 from excessive torque. The maximum torque to be transmitted by the friction clutch 120 is set by the spring disks 129. Preferably, the maximum torque to be transmitted by the friction clutch 120 is set at between 120% and 350% of the average torque at the driven shaft 105 of the supercharger 100 at maximum engine power and at wide open throttle performance. More preferably, the maximum torque to be transmitted by the friction clutch 120 is set at between 150% and 250% of the average torque at the driven shaft 105 of the supercharger 100 at maximum engine power and at wide open throttle performance.

Since the friction clutch module 120 is biased in the engaged position and there is no exterior actuation of the friction clutch 120, pre-assembly of the intermediate shaft 120, intermediate drive gear 122 and driven gear 124 into a module to be installed on the engine 10 is possible.

The reduction gear 115 which is used to transmit the torque of the starter 133 is mounted and supported onto the intermediate shaft 110 by a bearing 147. The reduction gear 115 includes inner extension 149 forming the inner portion of the one-way clutch 116. The outer portion of the one-way clutch 116 is formed by a drum 151 rigidly connected to the intermediate shaft 110. A one-way locking device 153 is positioned between the inner extension 149 and the drum 151 and engages the inner extension 149 and the drum 151 only in the direction of the torque load i.e. from the reduction gear 115 to the intermediate shaft 110, and allows free rotation in the other direction. Maximum torque is transmitted from the reduction gear 115 to the intermediate shaft 110 through the one-way clutch 116 when the engine is being starter by the electric starter 33.

Figure 13:
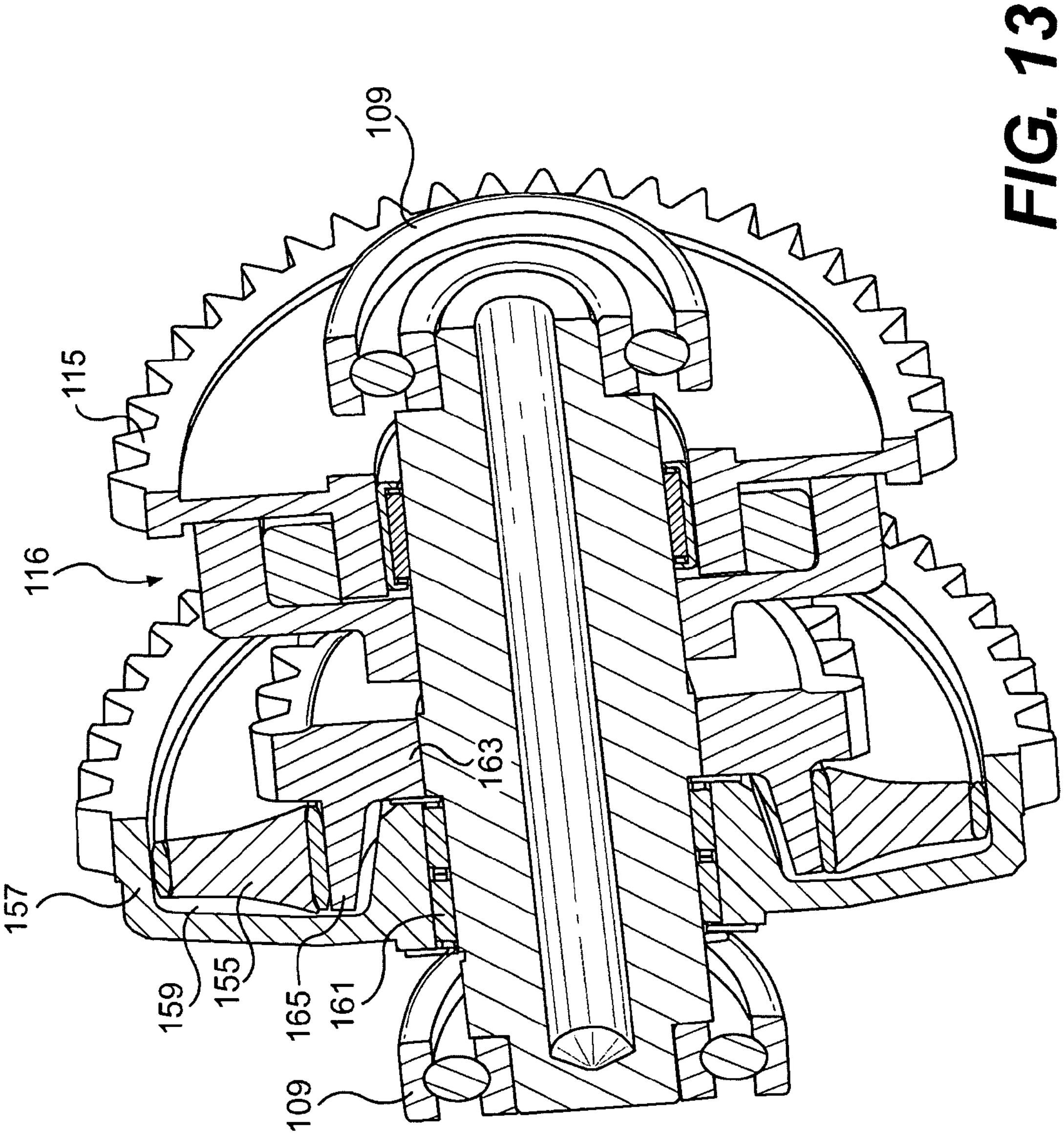
FIG. 13 is a schematic cross-sectional perspective view of a second embodiment of an intermediate shaft having an elastomeric damper assembly.

Referring now to FIG. 13 which illustrates a second embodiment of the intermediate shaft 110 and clutch assembly; in this particular embodiment the friction clutch 120 shown in FIG. 12 is replaced by an elastomeric damper 155. The intermediate drive gear 157 is mounted and supported by the intermediate shaft 110 on a bearing 161 allowing independent movement between the intermediate drive gear 157 and the intermediate shaft 110. The intermediate drive gear 157 is shape like a drum having a recessed cavity 159 which houses the elastomeric damper 155. The intermediate driven gear 163 is rigidly connected to the intermediate shaft 110. The intermediate driven gear 163 includes an inner member 165 extending into the drum recessed cavity 159 which is linked to the intermediate drive gear 157 through the elastomeric damper 155. The elastomeric damper 155 is squeezed under pressure between the inner extension 149 and the drum 151 and acts as a damper between the intermediate drive gear 157 and intermediate driven gear 163 for dampening or softening the torque peaks transferred between the intermediate drive gear 157 and intermediate driven gear 163. The elastomeric damper 155 has a specific density such that torque that can be transmitted yet torque peaks or variations are absorbed at least partially. The choice of elastomeric damper 155 defines the amount of torque that can be transmitted from the intermediate driven gear 163 to the intermediate drive gear 157 and the torque variation absorption coefficient.

The elastomeric damper 155 also at least partially isolate the supercharger 100 from the continuous torque peaks produced by every combustion in each individual cylinder.

The elastomeric damper 155 assembly shown in FIG. 13 is preferably combined with a friction clutch mounted either directly on the driven shaft 105 of the supercharger 100 or on the intermediate shaft 110 itself. This combination substantially reduces the microslips caused by the continuous torque peaks produced by every combustion in each individual cylinder, thereby substantially reducing heat input to the friction clutch. The elastomeric damper 155 also reduces at least partially the energy of torque variations to the friction clutch. The combination of friction clutch and damper reduces the heat input to the friction clutch and hence increases its durability.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

What is claimed is:

1. A supercharged internal combustion engine comprising:

a crankcase having a crankshaft rotatably mounted therein;

a cylinder block connected to the crankcase;

a cylinder head connected to the cylinder block wherein the cylinder block and the cylinder head form at least one combustion chamber;

at least one air intake passageway operatively coupled to the combustion chambers;

an air intake manifold connected to the cylinder head and operatively connected to the at least one air intake passageway; and a supercharger for boosting air to the air intake manifold, the supercharger having a driven shaft operatively connected to the crankshaft via a friction clutch supported by an intermediate shaft; and a counter balancing shaft operatively connected between the crankshaft and the friction clutch of the intermediate shaft such that the intermediate shaft is driven by the counter balancing shaft.

2. A supercharged internal combustion engine as defined in claim 1, wherein the intermediate shaft includes first gear operatively connected to the counter balancing shaft and a second gear operatively connected to the driven gear of the supercharger, the friction clutch of the intermediate shaft linking the first gear to the second gear.

3. A supercharged internal combustion engine as defined in claim 1, further comprising an elastomeric damper supported by the intermediate shaft, the driven shaft being operatively connected to the crankshaft via the elastomeric damper.

* * * * *